United States Patent [19]
Ghersa et al.

[11] 3,847,693
[45] Nov. 12, 1974

[54] BUOYANT HOSE AND METHOD FOR MAKING SAME

[75] Inventors: Piero Ghersa; Flavio Torghele; Cesare Laberinti, all of Milan, Italy

[73] Assignee: Industrie Pirelli S.P.A., Milan, Italy

[22] Filed: July 24, 1973

[21] Appl. No.: 382,073

Related U.S. Application Data

[62] Division of Ser. No. 159,763, July 6, 1971, Pat. No. 3,773,090.

[30] Foreign Application Priority Data
Feb. 12, 1971    Italy................................. 20456/71

[52] U.S. Cl.................... 156/79, 9/8 R, 138/144, 138/149, 156/188, 156/191, 156/192, 156/195, 156/304, 161/160, 161/190
[51] Int. Cl............................................. B32b 5/18
[58] Field of Search........... 260/2.5 BD; 156/78, 79, 156/294, 304, 195, 187, 188, 191, 192; 138/141, 144, 149; 161/160, 190; 9/8 R; 264/45

[56] References Cited
UNITED STATES PATENTS
3,119,415    11/1964    Galloway et al................ 138/144 X
3,650,299    3/1972    Seiler et al.......................... 138/149

*Primary Examiner*—Edward G. Whitby
*Attorney, Agent, or Firm*—Clelle W. Upchurch

[57]    ABSTRACT

The invention relates to a buoyant flexible hose and method for making same wherein buoyancy is imparted to the hose by an annular sleeve which surrounds said hose and is constituted by an inner layer consisting of a series of axially successive preformed annular bodies of cellular high polymer which are surrounded by an outer layer of a wear resistant polymeric material with the interposition of an intermediate layer of a reinforcing fabric between said inner and outer layers. The outer layer is formed in situ and together with the intermediate layer constitutes a unitary body structure, which is continuous and uninterrupted in the entire extent along said axially successive annular bodies.

4 Claims, 1 Drawing Figure

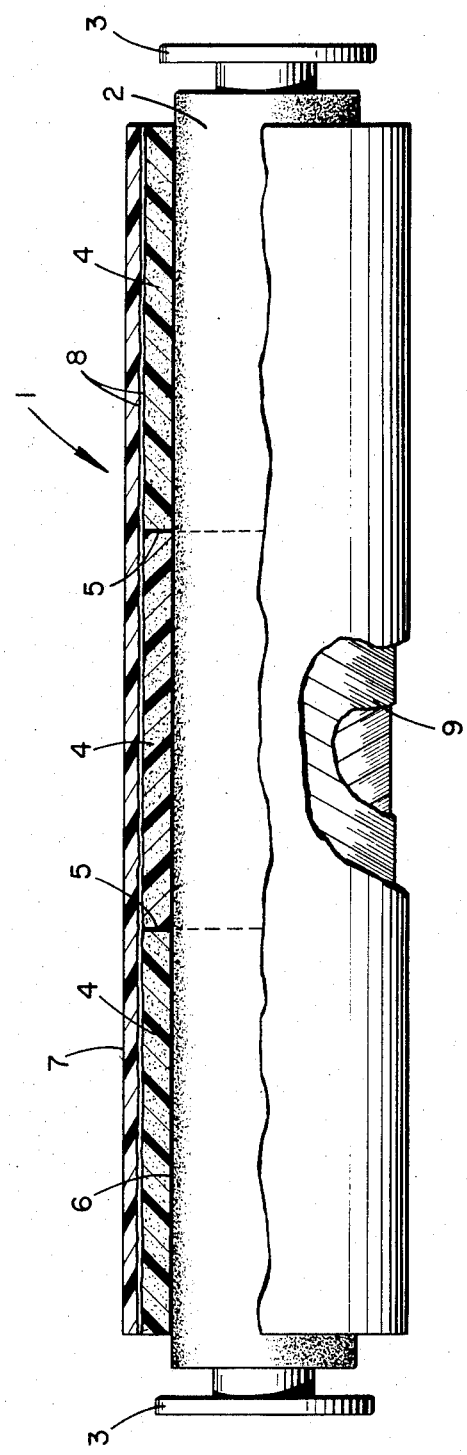

3,847,693

BUOYANT HOSE AND METHOD FOR MAKING SAME

This is a division, of application Ser. No. 159,763, filed July 6, 1971 U.S. Pat. No. 3,773,090.

The present invention relates to an improvement to the invention disclosed in Italian Patent application No. 24,885A/70 filed in Italy on May 20, 1970, and Ser. No. 144,832 filed in the U.S. on May 19, 1971 under the title of IMPROVED FLOATING ELEMENT, AS SLEEVE FOR FLEXIBLE HOSES AND THE LIKE, AND PROCESS FOR ITS MANUFACTURE, and more precisely it relates to a buoyant sleeve of a cellular high polymer and to the process for making same, said sleeve being used for forming a floating hose or pipeline.

The prior patent application describes and illustrates a buoyant sleeve consisting of a cellular high polymer with nonintercommunicating cells, for instance polyvinyl chloride, which can be applied to flexible hoses to render them buoyant in water, and is characterized in that at least a part of the surface of the cellular high polymer is covered with a relatively thick protective covering of compact, or microcellular polyurethane, formed "in situ," whose average thickness is preferably between 1 and 10 mm, said covering being intimately adhered to said surface and joined to it by anchorage of the polyurethane to the cellular structure of said surface. A reinforcing sheer fabric may be disposed within the thickness of the polyurethane covering or between the latter and the body of high polymer.

The process described in said prior patent application is characterized in that the polyurethane material constituting the covering is produced, without application of external heat, directly on the shaped body of cellular high polymer having nonintercommunicating cells, whose outer skin has been removed from at least a part of its surface.

It is desirable to improve the wear resistant part of the sleeve, namely the polyurethane covering and the reinforcing fabric, and it has been found that this can be realized if the final operations for the sleeve manufacture are carried out after said sleeve has been assembled on the flexible hose.

According to the invention, each flexible hose section of the floating pipeline comprises a said sleeve which consists of a group of prefabricated annular bodies of a cellular high polymer, the bodies in each group being joined respective to each other in axial succession and also to the hose surface by means of layers of adhesive agent. Both the reinforcing sheer fabric and the polyurethane covering are in the form of axially uninterrupted, continuous layers covering the entire axial extent of each group of bodies.

The reinforcing fabric is a helically wound tape, preferably wrapped in opposite directions to form two superposed layers.

The process according to the present invention is characterized in that a plurality of prefabricated annular bodies of a cellular high polymer deprived of their surface skin are mounted axially adjoining each other on a flexible hose, with an adhesive agent on the adjacent radial end surfaces which are to abut each other and also on the inner annular surfaces which are to come into contact with the outer circumferential surface of said hose. A continuous reinforcing sheer fabric is then applied on the outer circumferential surfaces of the whole succession of joined bodies and a liquid mixture of reaction substances intended to form the continuous polyurethane covering for the whole succession is applied in a continuous manner and at room temperature over said fabric and the reaction is allowed to take place up to the complete formation of the polyurethane.

The same substances as those disclosed in the prior patent application can be used as the reaction mixture.

The use of a reinforcing sheer fabric in the form of a tape helically wound about the hose is particularly advantageous.

At least two helical layers of said reinforcing tape are preferably wound in opposite directions to each other.

If desired, the application of the reinforcing fabric or, in particular, of the reinforcing helical tape, can occur after a first partial coating of the liquid polyurethane forming reaction substances and the formation of a fraction of the final thickness of the polyurethane covering. The remainder of the thickness of said covering is completed subsequently.

The sole FIGURE of the attached drawing illustrates a sleeve according to the invention, partially in longitudinal section and partially broken away to disclose internal details.

The sleeve 1 of this invention is mounted on a conventional rubber flexible hose section 2 which includes metal connector fittings 3. The sleeve is constituted by an axial succession of bodies 4 of a cellular high polymer with non-intercommunicating cells, for instance polyvinyl chloride. By way of example, the FIGURE represents a sleeve constituted by three such bodies 4.

The bodies are joined together along their abutting end radial faces by means of a layer 5 of adhesive agent, and are also joined to the outer circumferential surfaces of the hose 2 by means of a layer 6 of adhesive agent.

On their free outer circumferential surfaces, the three joined bodies 4 of cellular high polymer have a polyurethane covering 7 which extends continuously without interruption over the whole succession of said bodies 4. A pair of layers of reinforcing sheer fabric 8 is arranged between the covering 7 and the succession of the joined bodies 4.

More precisely, each of said layers comprises a helical winding of a tape 9 which extends along the entire axial extent of the bodies 4, the helices of the two layers having opposite directions. In the FIGURE can be seen the external tape 9 of the reinforcing layer 8.

The bodies 4 of a cellular high polymer are deprived of their outer skin in order to facilitate the bonding of those surfaces treated with the adhesive agent and in order to make possible the anchorages of the polyurethane covering to the outer surfaces of the bodies 4.

In the FIGURE, the bodies 4 of high polymer have a cylindrical shape.

If desired, a frusto-conical shape can be adopted at least for the terminal annular bodies, in order to suit the analogous shape of the oil hoses adjacent at their fittings and also to provide added buoyancy for the weight of the fittings.

The floating sleeve according to the invention offers improved characteristics of mechanical resistance by virtue of the continuity both of the polyurethane covering and of the reinforcing fabric along the entire extent of the prefabricated bodies 4.

Such continuity of the reinforcing fabric and of the polyurethane covering confers advantageous characteristics of a greater simplicity to the process for sleeve manufacture.

As the invention has been described and represented only by way of non-limiting example, it is understood that its applicability includes any other modification to its whole and to its details, which is derived from the basic criteria on which the invention is grounded.

What is claimed is:

1. A method for applying a buoyant sleeve around a hose member so as to render said member buoyant in water, comprising:
    a. fitting a plurality of prefabricated annular bodies of cellular high polymer material around a hose member, with said bodies being arranged in axial succession, their radial end surfaces abutting each other and their inner annular surfaces in contact with the outer surfaces of said hose member, said bodies being free of the surface skin which is common to cellular high polymer material;
    b. applying an adhesive agent to said end surfaces and to said annular inner surfaces to thereby, respectively, adhesively join said bodies together and anchor same to said hose member;
    c. applying a reinforcing sheer fabric around said bodies; and
    d. applying a polyurethane forming liquid reaction mixture at room temperature continuously around said fabric and permitting said mixture to react to form a unitary continuous outer layer of polyurethane around said fabric.

2. The method of claim 1, wherein said sheer fabric is applied in the form of a tape which is helically wound along the entire outer surface of said annular bodies.

3. The method of claim 2, wherein said tape is wound in respective opposite directions to form two superposed layers of tape.

4. The method of claim 1, wherein said fabric is applied after a first thin layer of said polyurethane forming mixture has been applied over said bodies and subsequently the remainder of said mixture is applied around said fabric.

* * * * *